United States Patent
Brudy

[11] 3,811,715
[45] May 21, 1974

[54] RETRACTOR ASSEMBLY

[75] Inventor: Peter E. Brudy, Willowdale, Ontario, Canada

[73] Assignee: Dominion Auto Accessories Limited, Ontario, Canada

[22] Filed: Aug. 21, 1972

[21] Appl. No.: 282,434

[30] Foreign Application Priority Data
Aug. 31, 1971 Great Britain............... 40,656/71

[52] U.S. Cl. .................................................. 403/93
[51] Int. Cl. ............................................ F16c 11/10
[58] Field of Search ...... 287/14, 101; 248/278, 282, 248/284

[56] References Cited
UNITED STATES PATENTS

| | | | |
|---|---|---|---|
| 1,029,699 | 6/1912 | Lilly | 287/14 |
| 2,488,642 | 11/1949 | Schaal | 287/14 |
| 3,586,355 | 6/1971 | Magi | 287/14 |
| 662,346 | 11/1900 | Brooks et al. | 287/14 |
| 2,922,669 | 1/1960 | Hansen | 287/14 |
| 2,044,589 | 6/1936 | Morgan | 287/14 |
| 3,433,511 | 3/1969 | Frankel | 287/14 |

Primary Examiner—Reinaldo P. Machado
Attorney, Agent, or Firm—Sim & McBurney

[57] ABSTRACT

This invention provides a retractor assembly in which a first and second member are connected adjustably by a bolt means or the equivalent so that they may rotate about a common axis with respect to each other. One of the members has radially outwardly directed rib means which resist deformation away from an unstressed position, while the other member has a conically diverging wall centered on the axis, the wall having a number of outward grooves adapted to receive the rib means upon mutual rotation of the members. The members are capable of mutual axial displacement to compensate for wear of the rib means.

13 Claims, 8 Drawing Figures

PATENTED MAY 21 1974 3,811,715

RETRACTOR ASSEMBLY

This invention relates to retractor assemblies of the kind used to mount side-view mirrors on vehicles.

The particular mirror mounting to which this invention is applicable involves a rigid frame mounted on a vehicle, rigid arms attached to the mirror, and a swivel coupling between the arms and the frame constructed such that the mirror can be selectively set at several different angulations with respect to the vehicle.

The retractor assembly of this invention is intended to provide for such selective angulation between the mirror and the vehicle.

One of the disadvantages of conventional retractor assemblies is that the registration means of the assembly, which move into and out of registry as the mirror is swung with respect to the vehicle, eventually become worn and incapable of retaining the mirror in the selected desired position. It is primarily toward the solution of this problem that the present invention is directed.

Accordingly, this invention provides a retractor assembly comprising a first member and a second member, adjustable connecting means holding said members together for mutual rotation about a common axis, said first member having radially outwardly directed rib means adapted resiliently to resist deformation away from an unstressed position, said second member having conically diverging wall means centered on said axis, said wall means having a plurality of outward grooves spaced circumferentially and adapted sequentially to receive said rib means upon mutual rotation of said members, said grooves following meridians of said conically diverging wall means, the members being capable of mutual axial displacement to compensate for wear of the rib means.

Five embodiments of this invention are shown in the accompanying drawings, in which like numerals denote like parts throughout the several views, and in which.

Figure 1:
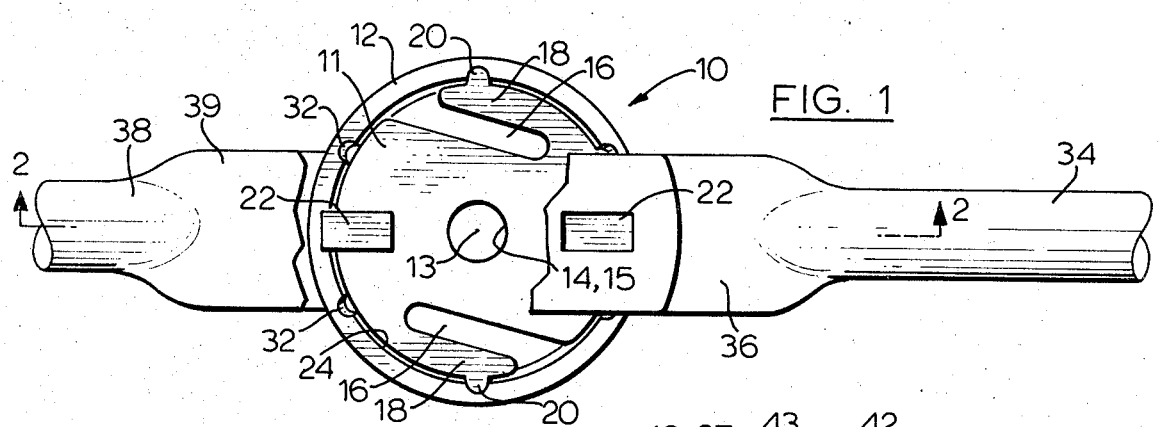
FIG. 1 is a plan view of a first embodiment of this invention, with certain parts broken away to show the structure.

Looking at FIG. 1, the retractor assembly 10 of the first embodiment of this invention is seen to include a first member 11 and a second member 12, each being generally symmetrical about a common central axis 13 about which they are in mutual axial alignment. The first and second members 11 and 12 have aligned central bores 14 and 15, respectively. The first member 12 has two cut-away slots 16 which define two resilient arms 18 each bearing a radially outwardly extending rib 20. Preferably, both members of the retractor assembly 10 are constructed entirely of resilient material, such as The slots 16, the arms 18 and the ribs 20 are arranged in diametrically opposed positions. The first member 11, which is generally circular with the exception of the cut-away slots 16, has two upwardly protruding portions 22 which are arranged antipodally with respect to the central axis 13, and which are equidistant from the ribs 20.

The second member 12 is generally circular, and defines an internal recess 24 which has a flat circular bottom wall 25, and a conically upwardly diverging side wall 27. The second member 12 has two downwardly protruding portions 30 (see FIG. 2), which are arranged antipodally about the central axis 13.

Around the conical side wall 27, at regular intervals, are grooves 32, all of which lie in planes containing the central axis of the members 11 and 12, but which are slightly sloping with regard to the central axis 13, due to the conical configuration of the side wall 27. Thus, the grooves 32 follow meridians of the side wall 27, where a meridian of a surface of revolution is defined as a line on that surface lying in a plane containing the axis of revolution. The ribs 20 on the first member 11 are also angulated to the same degree, and are adapted to register in opposing pairs of the grooves 32. In the embodiment shown, there are six grooves, i.e. three pairs of grooves, and thus the members 11 and 12 can take up six different mutual angulations.

Figure 2:
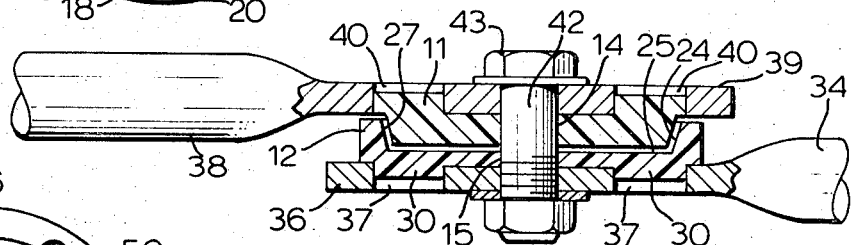
FIG. 2 is an axial sectional view taken at the line 2—2 in FIG. 1.

As seen in FIGS. 1 and 2, a first structural arm 34 has a flattened portion 36 with two rectangular passages 37 adapted to receive the downwardly protruding portions 30 of the second member 12. Similarly, a second structural arm 38 has a flattened portion 39 with two rectangular passages 40 which are adapted to receive the upwardly protruding portions 22 of the first member 11.

Passing downwardly through the central bore 14, 15 is the shank 52 of a bolt 43, equipped with the usual washers and nut.

Because of the conical shape of the side wall 27, and the complimentary sloping nature of the ribs 20 and the grooves 32, the gradual wearing away of the ribs 20 through use can be compensated by gradually tightening down the bolt 43, and thus urging the members 11 and 12 more closely together, it being understood that they are dimensioned initially such that the ribs 20 will register in the grooves 32 while leaving some space between the bottom of the member 11 and the flat circular bottom wall 25 of the internal recess 24 of the second member 12.

Figure 3:
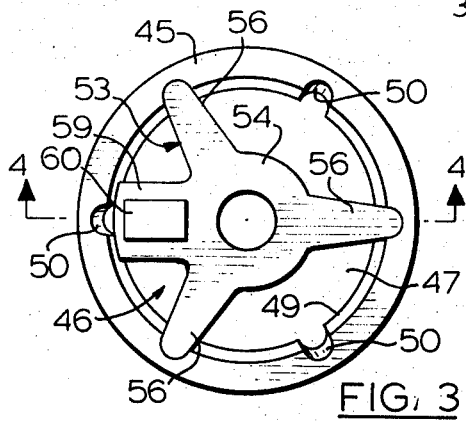
FIG. 3 is a plan view of a second embodiment of this invention.
Figure 4:
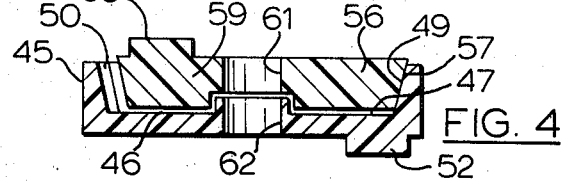
FIG. 4 is an axial sectional view taken at the line 4—4 in FIG. 3.

Attention is now directed to FIGS. 3 and 4, in which the second embodiment of this invention is shown. A generally circular member 45, similar to the second member 12 in FIG. 2, has an internal recess 46 which includes a flat bottom wall 47 and a diverging conical side wall 49. Six equally spaced grooves 50 are arranged in the side wall 49, similar to the grooves 32 in FIGS. 1 and 2. The member 45 has a downward protrusion 52 adapted to register in a suitable opening of an arm similar to the arm 34 shown in FIG. 2, but not shown in FIG. 4.

An upper member 53 includes a central boss 54 having three radial fingers 56, each of which has a rounded sloping end 57 constituting a rib corresponding to each of the ribs 20 in FIGS. 1 and 2. The central boss 54 also has a radial extension 59 which bears an upward protrusion 60 adapted to register in a suitable opening of an arm similar to the arm 38 shown in FIGS. 1 and 2. A nut-and-bolt fastening arrangement, similar to that shown in FIG. 2 but not shown in FIGS. 3 and 4, is adapted to secure the upper member 53 to the lower member 45 through aligned bores 61 and 62, the bolt also passing through both arms (neither shown), each of which is locked to one of the members 53,45 by means of the protrusions 60,52.

In the same way as the embodiment shown in FIGS. 1 and 2, the second embodiment is designed in such a way that wear through use can be compensated by tightening the bolt. Naturally it is the conical shape of the side wall 49 and the sloping angulation of the grooves 50 which permits this compensation to take place.

Figure 5:
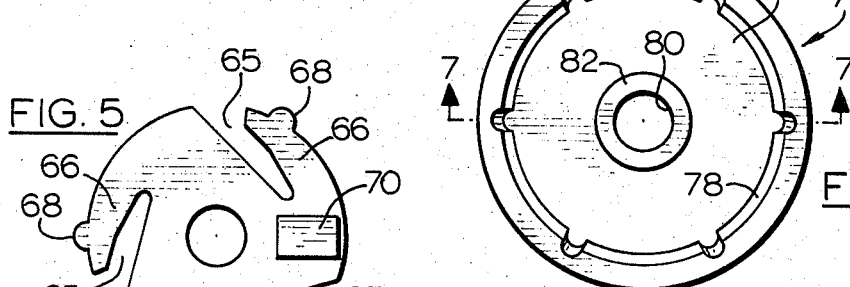
FIG. 5 is a plan view of a third embodiment of this invention.
Figure 5:
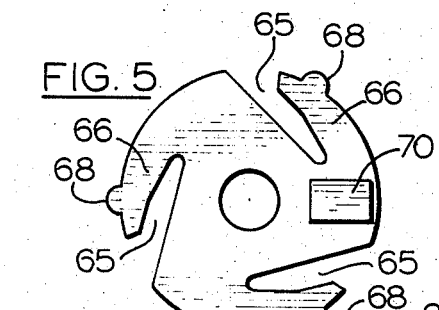

Attention is now directed to FIG. 5, showing the third embodiment of this invention, which is similar in most respects to the first member in FIG. 1, but differs therefrom in having three cut-away portions 65 defining three resilient arms 66, each bearing a radially extending rib 68. The ribs 68 are located at 120° from each other. The member shown in FIG. 5 can replace the first member 11 shown in FIG. 1, since it can be used with the second member 12 shown in FIGS. 1 and 2. The member shown in FIG. 5 also has an upwardly protruding portion 70 adapted to register in a suitable passageway through an arm such as the arm 38 shown in FIGS. 1 and 2.

Figure 6:
FIG. 6 is a plan view of a portion of the fourth embodiment of this invention.
Figure 7:
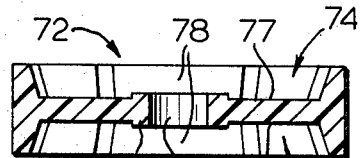
FIG. 7 is an axial sectional view taken at the line 7—7 in FIG. 6.

Attention is now directed to FIGS. 6 and 7, showing the fourth embodiment of this invention. The member 72 shown in FIGS. 6 and 7 is similar to the lower member 45 shown in FIG. 3, but differs therefrom in that it defines two recesses 74 and 75, these two recesses being on opposite faces of the member 72. As best seen in FIG. 7, each recess 74,75 has a flat bottom 77 and a sloping or conical side wall 78. The member 72 has a central bore 80 around which is a boss 82 of slightly greater axial extent than the distance between the two bottoms 77. The member 72 can be used with a pair of members such as the first member 11 of FIG. 1, the upper member 53 of FIGS. 3 and 4 and the member shown in FIG. 5.

Figure 8:
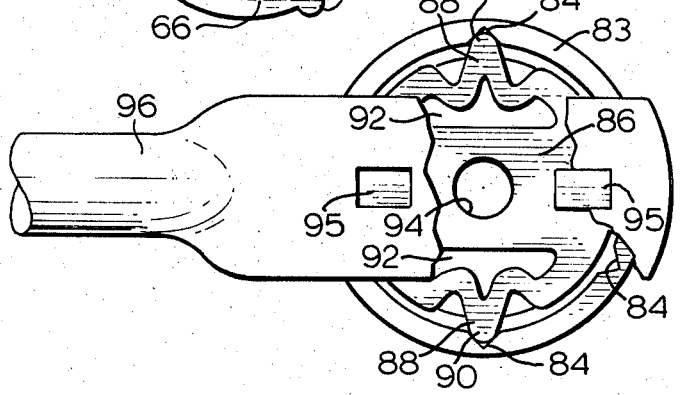
FIG. 8 is a plan view of the fifth embodiment of this invention.

Attention is now directed to FIG. 8, in which the fifth embodiment of this invention is shown. In FIG. 8, a lower member 83 is similar to the lower member 45 shown in FIG. 4, with the exception that the grooves 84 are V-shaped rather than semi-circular in section. This embodiment also includes an upper member 86 which has, instead of resilient arms or fingers, two corrugated protrusions 88, each of which includes a registering portion 90 having a sloping end surface adapted to register in the sloping V-grooves 84. The registering portions 90 are analogous to the ribs in the embodiments already described. Two cut-away portions 92 help to define the corrugated protrusions 88 which, due to their corrugated shape, have a considerable measure of resilience. The upper member 86 also has a central bore 94, which continues through the lower member 83, and further has upward protrusions 95 adapted to register in suitable passages in an arm 96, which has been shown in FIG. 8 partly broken-away.

In the appended claims, the word 'groove' is intended to include not only the grooves 32, 50 and 84, but also any equivalent structure, such as pockets, gaps, creases and recesses, capable of receiving the ribs and out of which the ribs can be forced either radially inwardly or in the direction parallel to the central axis.

It is to be understood that, while a sloping angulation of the grooves is essential to the proper functioning of the retractor assembly disclosed herein, such sloping angulation need not necessarily be applied to the ribs which are received in the grooves. The ribs may be constituted by protrusions which are spherical, semi-cylindrical, wedge-shaped or irregular. Naturally, the sloping angulation of the grooves will tend to wear the ribs into a profile more or less complimentary to the grooves regardless of their original shape.

What I claim is:

1. A retractor assembly, comprising:
   a first member and a second member,
   adjustable connecting means holding said members together for mutual rotation about a common axis,
   said first member being a plate from which a plurality of spaced resilient arms project, each arm supporting a radially outwardly directed rib adapted resiliently to resist deformation away from an unstressed position,
   said second member having conically diverging wall means centered on said axis, said wall means having a plurality of outward grooves spaced circumferentially and adapted sequentially to receive said ribs upon mutual rotation of said members, said grooves following meridians of said conically diverging wall means, the members being capable of mutual axial displacement to compensate for wear of the ribs.

2. The invention claimed in claim 1, in which the second member has a recess defined in part by a substantially flat bottom wall normal to said common axis, said conically diverging wall means being contiguous with said bottom wall and further defining said recess, said first member being at least partly receivable within said recess.

3. The invention claimed in claim 2, in which said first and second members include means by which they may be fixed to first and second structural arms, respectively.

4. The invention claimed in claim 1, in which the arms are adapted to deform in the plane of the plate to permit the ribs to move radially inwardly and thus out of engagement with said grooves.

5. The invention claimed in claim 4, in which the arms are elongated in directions other than radial.

6. The invention claimed in claim 1, in which the arms are adapted to deform in planes normal to the plane of the plate to permit the ribs to move in the direction parallel to said axis and thus out of engagement with said grooves.

7. The invention claimed in claim 6, in which the arms are disposed substantially radially.

8. The invention claimed in claim 4, in which each arm is joined at one end to the plate and carries its rib adjacent its other end.

9. The invention claimed in claim 4, in which each arm is joined at both ends to the plate and carries its rib substantially mid-way between its ends.

10. The invention claimed in claim 1, in which the second member has two oppositely facing recesses having a common, substantially flat bottom wall normal to said common axis, said conically diverging wall means including a first and a second frusto-conical wall, said walls diverging in opposite directions from said bottom wall and defining a first and a second recess, both frusto-conical walls having a plurality of said outward grooves, said first member being at least partly receivable within the first recess, the retractor assembly including a third member held together with said first and second members for mutual rotation about said common axis, said third member having radially outwardly directed rib means adapted resiliently to resist deformation away from an unstressed position, said third member being at least partly receivable within said second recess with its rib means receivable within the outward grooves of said second recess.

11. The invention claimed in claim 10, in which said first and third members include means by which they may be fixed to first and second structural arms, respectively.

12. The invention claimed in claim 1, in which said ribs are elongated parallel to meridians of the adjacent conically diverging wall means.

13. The invention claimed in claim 1, in which said adjustable connecting means includes a bolt and nut combination extending through suitable bores in said first and second members.

* * * * *